Nov. 8, 1927.
L. I. OBLINGER
PIPE THREADING TOOL
Filed Nov. 2, 1925
1,648,502
2 Sheets-Sheet 1
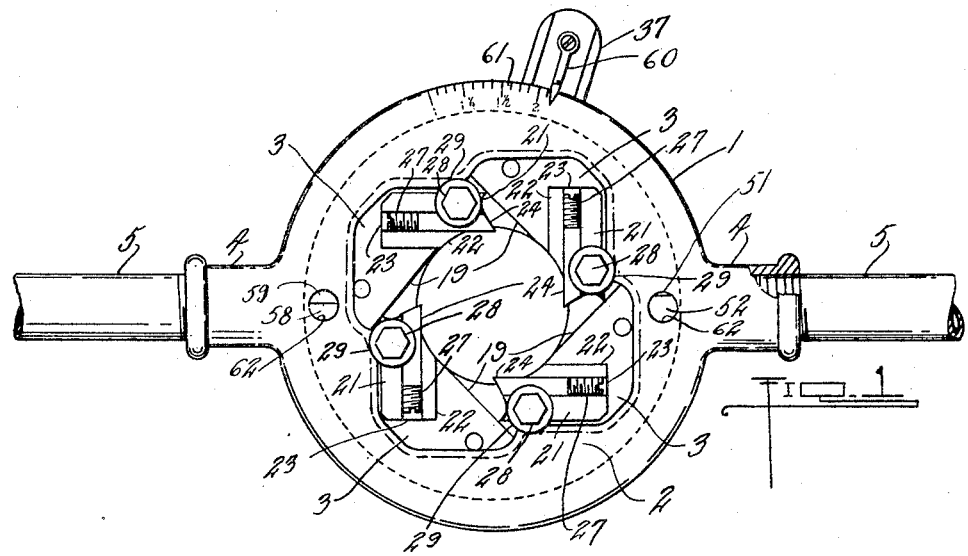
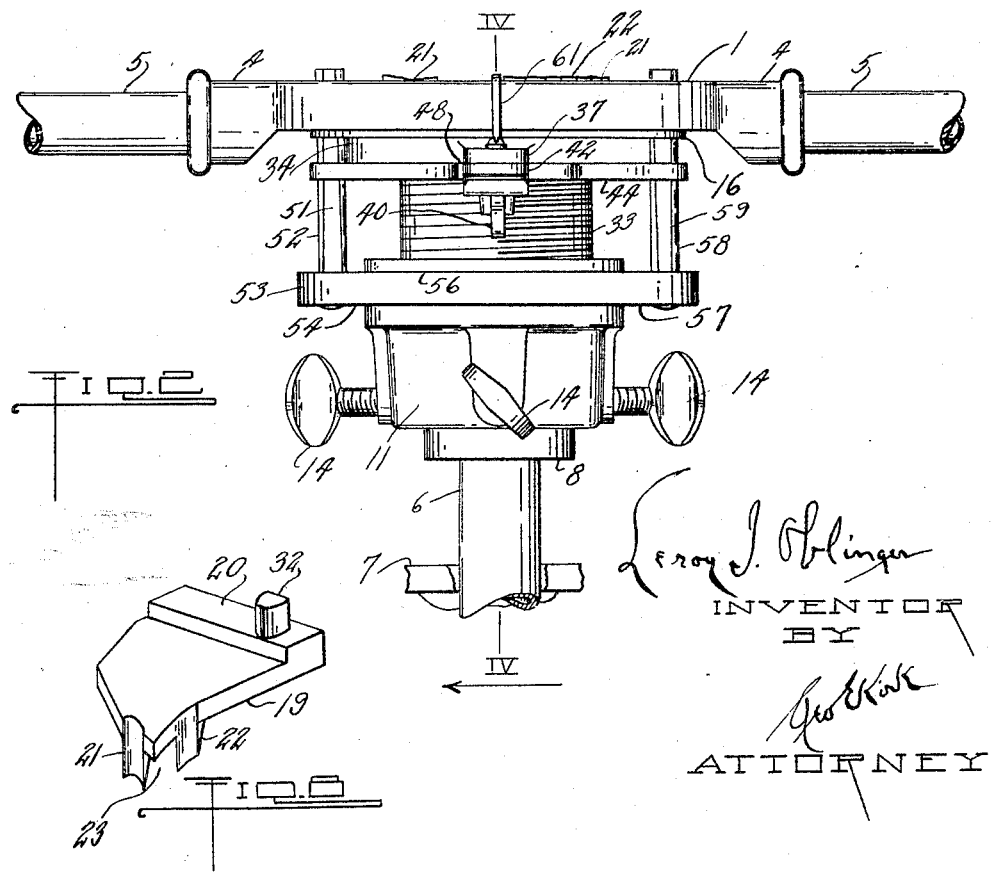

Nov. 8, 1927.
L. I. OBLINGER
1,648,502
PIPE THREADING TOOL
Filed Nov. 2, 1925   2 Sheets-Sheet 2
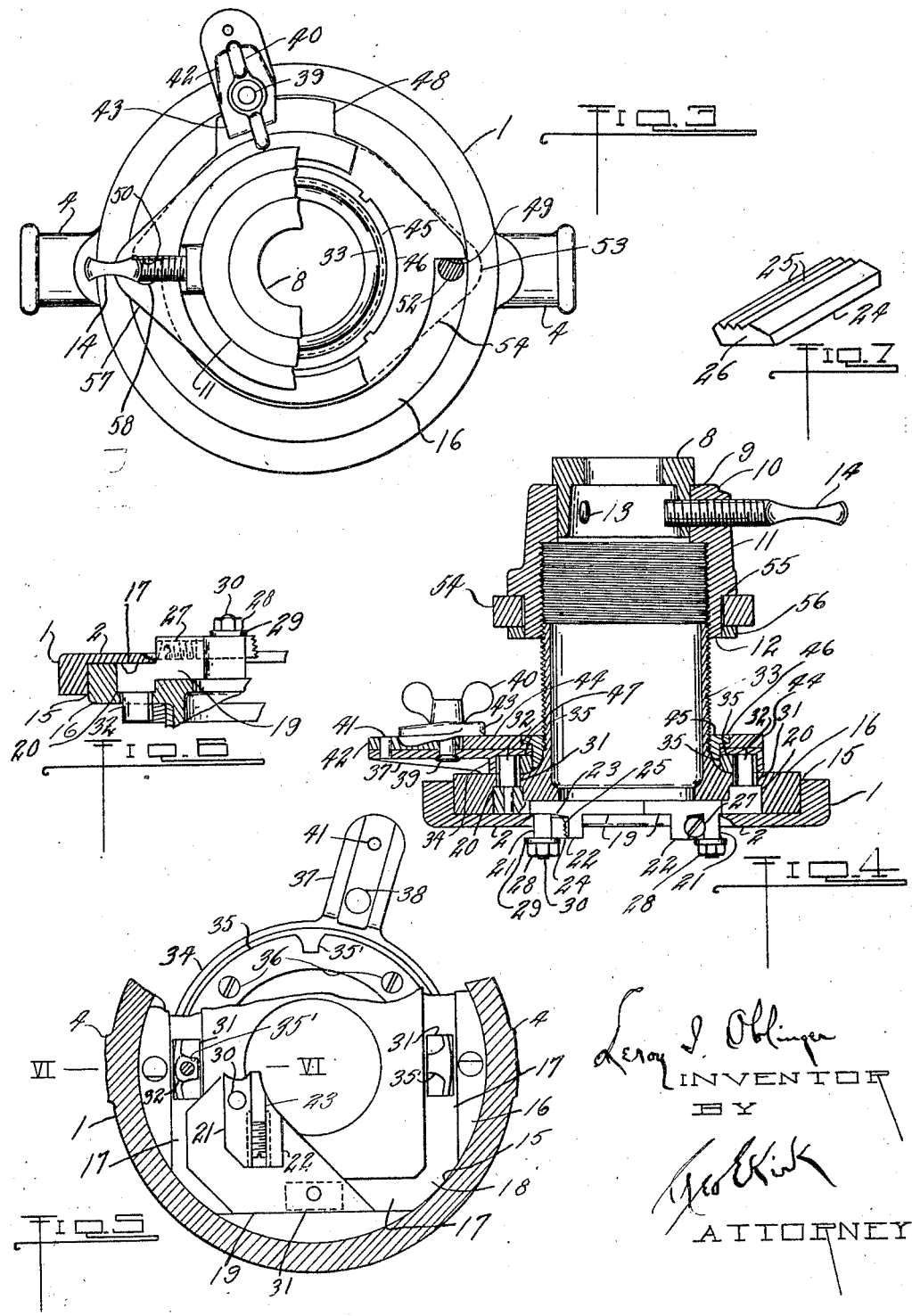

Patented Nov. 8, 1927.

1,648,502

UNITED STATES PATENT OFFICE.

LEROY I. OBLINGER, OF EAGLE POINT COLONY, OHIO.

PIPE-THREADING TOOL.

Application filed November 2, 1925. Serial No. 66,253.

This invention relates to cutting implements.

This invention has utility when incorporated in sequential cutting by a plurality of dies or chasers in forming threads as for metallic pipe.

Referring to the drawings:

Fig. 1 is a front view, with parts broken away, of an embodiment of the device in a hand operable pipe threading tool;

Fig. 2 is a fragmentary view of the tool of Fig. 1 from the side;

Fig. 3 is a view of the tool of Fig. 1, from the rear or work gripping end, that is, opposite to the showing in Fig. 1, with parts broken away;

Fig. 4 is a section on the line IV—IV, Fig. 2;

Fig. 5 is a view from the front or die end as shown in Fig. 1, with portions of the head and other parts broken away;

Fig. 6 is a section on the line VI—VI, Fig. 5;

Fig. 7 is a perspective view of one of the chaser or die elements; and

Fig. 8 is a perspective view of a die holder.

Cutter head or ring 1 is shown as having inwardly extending flange 2 on its front or die side having central clearance portions 3 responding to the number of dies or chasers in the sequential series. This cutter head ring 1 is shown as having diametrically outwardly extending bosses 4 internally threaded to receive handles 5, which handles 5 may be operated when work 6 is held in vise 7 as a fixed holder for such work, the handles 5 being swung in a plane perpendicular to the axis of the pipe 6.

Mounted on the pipe 6 is centering guide or bushing 8 having outer shoulder 9 abutting ledge 10 of sleeve portion 11 on nut 12. The work guide bushing 8 is provided with three openings 13 through which loosely extend wing bolts 14 as threaded in the sleeve extension 11 of the nut 12. These wing bolts 14, as protruding through the openings 13 in the bushing 8, serve as a work gripping, as well as centering lock for holding the tool or implement as to the work.

The ring 1, has, rearwardly of the flange 2, a circular seat 15 in which is disposed plate 16 having tangentially extending ways 17 herein shown as four in number, one responding to each of the dies or chasers used. These ways 17 may be cut directly in the plate 16 from the peripheral portions and are herein shown as having communication portions 18. As these ways 17 are symmetrically disposed, the result is an approximately square continuous way portion in this plate 16 on the side thereof toward the flange 2.

Die holders 19 are disposed to have depending tongues 20 coact with the respective ways 17 in the plate 16 and to be held in such position by the flange 2 with clearance for travel tangentially. Furthermore, each of these die holders 19 has outwardly upstanding ledges 21, 22, projecting through the opening 3 and providing therebetween a way 23 at 90° from the tongues 20. In this way 23 is die or chaser 24 having thread carrying grooves 25 on the radially inward side which extends tangentially away from advance or cutting edge termini of these thread cutting portions at lead-in face 26. From the lead-in face 26, these grooves 25 extend in a straight line of uniform follower contour therefrom. The chaser is of extent transversely of the threads less than the normal threading distance, and is accordingly a fraction only of the normal finished threading portion of the stock. This lead-in face 26, as an advance cutting edge region, may radially be given the desired rake or angle as to the grooves 25 of the desired form and size or thread as to the stock to be handled and the speed of operation, which angle may be retiring, perpendicular, or advancing from such grooves. Grinding back of the die lead in face 26 is an effective sharpening up-keep for maintaining the detail of such serration or grooves. The sharpening at the selected angle thus gives life for full use of the die 24. The die 24 may be adjusted into an actual tangent position slightly in advance of, or slightly back of the actual tangent position as desired for the work, although an approximation of this tangent position is deemed preferable. If the position be slightly in advance, the grooves 25 serve as hold in guides to a greater lineal extent than when the adjustment is just tangential or short of tangential relation. This longitudinal adjustment of the die 24 in the guide 23, between the ledges 21, 22, is effected by adjusting screw 27, and when such adjustment is attained, clamping nut 28 is tightened against washer 29 in threading down on threaded stem 30 as carried by the ledge 21.

Each of the ways 17 has preferably in its central portion, opening 31, through the plate 16, into which opening 31 may extend depending gear tooth 32, as a rack portion from the die holder 19. The plate 16 has coaxially with the seat 15, an externally threaded sleeve portion 33 engaging with the nut 12. Loosely mounted on this plate 16 about the sleeve 33 is control pan or ring 34 about a ring 35 with four recess teeth 35' therein, one for each die carrier and disposed 90° apart. This toothed ring 35 is assembled with housing plate member 34 of this control by screws 36. This pan or housing member 34 has radially extending arm 37 having opening 38 mounting stud 39 carrying wing clamping nut 40. This arm 37, radially beyond the stud 39, has projecting pin 41, as one anchor for clamping plate 42, which plate as operated by the wing nut 40 has ledge 43 frictionally locked against ring cam 44, thus held with the control pan 34 and the control pinion ring 35, as a unit. This unit is maintained in position relatively to the cutter head 1 by nut 45 having overhang 46 engaging seat 47 in the ring cam 44. The ring cam 44 has projection 48 of sufficient angular extent for the holding action of this clamping ledge 43. This ring cam 44 has diametrically disposed faces 49, 50. The face 49 coacts with cut-away portion 51 of pin 52 anchored in ear 53 of collar 54 relatively rotatable, as to the nut 12, in way 55 in which way it is held by locking shoulder ring 56 pressed into position thereon. Diametrically disposed as to this pin 52 (Figs. 2, 3), this collar 54 has ear 57 mounting parallel to to the pin 52, a pin 58 having on the opposite side from the threaded cut-away portion 51 of the pin 52, cut-away portion 59, i. e., this cut-away portion 59 is on the opposite side from the cut-away portion 51 of the pin 52 in considering progress around the axis of the cutter head 1. These cut-away portions 51, 59, are oppositely beveled in their cam action for effectual lost motion take-up as well as a positive guide for the control 44, 35, 34, as a unit for shifting the teeth 35' thus coacting with the rack teeth 32 of the die holders. This shifting from the pins 52, 58 occurs atuomatically in the progress of the use of the cutter head axially along the work, for, with the nut 12 held by the gripping screws 14, the rotation of the head 1 effects progress relatively, to such nut along the threaded sleeve 33. As this distance between the nut and head 1 changes, the control 34, 35, 44, angularly shifts relatively to the head 1 and thus through the teeth 35' as meshing with the teeth 32, moves the respective holders 19, and causes radial shifting of the several dies or chasers 24 along the ways 17 of the plate 16. In cutting a pipe, this radial shifting is outward in effecting automatically the cutting of the tapering thread. There is accordingly in this movement of the chasers an operation thereof as a progressive setting means.

Inasmuch as in some types of threading operations, the same size and pitch of threads are used for different diameters of work, the substitution of guide bushing 8 for the size of work may be had and then the wing nut 40 released and the arm 37 angularly shifted as to the head 1 to have the indicator 60 move along scale 61 of the cutter head 1 to the indication of the diameter of the work as adopted from the selection of the bushing 8. There is accordingly in this movement of the chasers an operation thereof as an adjustable setting means.

Accordingly, there is herein a simple manually operable tool which may be set within considerable range for size of work to be threaded by this rotary cutting operation. As so set, the operation of the device may be effective to progress the head 1 toward the nut 12 and by the action of the cam pins 52, 58, as guided through openings 62 in the head 1, release the die holders 19 for slight outward shifting positively and thus effect automatically the production of a tapering thread.

Furthermore, the tangential dies 24, are normally operable for cutting a thread of greater extent than the width of these dies. To such end, these dies are shifted for developing a tapering thread with the chaser die not of tapered form, but with the grooves 25 thereon uniform. With this type of tangential cutting die, there is not only an effective cutting edge, but one which is economical for upkeep over a continuous use or wearing down of such die. This particular die, as positively held herein, against vibration or chattering in the work, is held and guides itself for a clean cut thread even in resistant work. Furthermore, such thread is produced with a power economy. In fact, the hand operation of this tool, even on large pipe, is rapidly and easily accomplished.

In resetting the device for re-cutting a tapered thread of the same diameter, the backing off of the cutter head 1 from the bushing 8 in removing the work, places the tool in position for a repetition of such cutting or threading operation. The unit of the head structure is one maintaining the regions of travel of the holder clear of any cuttings working thereinto. This cutter portion or die, as projecting or protruding from the ring 1 through the openings 3, provides ample clearance for sluffing off clear of the tool for all cuttings and for lubrication of the work and dies or chasers as conveniently accessible at all times. The form of the head and co-operating elements is susceptible of simple rapid accurate assembly with the parts designed for refinements in rapid quantity production economy.

In operating the device herein, an extension of the pipe 6 is disposed beyond the clamp mounting or vise 7. As so mounted the cut end or terminus of such pipe is at right angles to the axis of the pipe. There is slipped over the end of this pipe bushing 8 to an extent to have the end of the pipe in the region of the dies or chasers 24. This position for the chasers 24, as carried by the head 1, is with the threaded sleeve 33 in a withdrawn position from the sleeve extension 11 fixed with the bushing 8. At such setting for the tool, the bolts 14 may be operated into clamping position. The arm 37 is adjusted by clamping wing nut 40 into the pipe size for operative cutting. If the thread be desired large, the pointer 60 may be positioned a little out of registry with the pipe size and toward the next larger indication marking on the scale 61. If it be desired standard, it should be at the indication for the pipe size on the scale 61, while if it be desired to have the thread deeper or slightly less than standard size, or diameter, the setting should be short of the indication on the scale 61. At such setting, the respective holders 19 are so shifted through the meshing coaction of the teeth 32, 35', that each of the chasers 24 is adjusted, and this simultaneous adjustment is concentric with the axis of the pipe 6, as well as the head 1. As this indicator adjustment for pipe size is locked there is a holding of this size adjustment for the entire set of chasers. The operator of the tool may then swing the handles 5 clockwise for right hand threaded operation, if the chasers be set for such and the tool be designed for that type of cutting, instead of left-hand. This will cause the sleeve 33 to travel into the sleeve extension 11 with the chasers 24 describing a helical path along the outside of the pipe 6 from its terminus. In this travel, due to the cam faces 51, 59, as cut away portions of the pins 52, 58, there is slight angular shifting of the cam ring 44 relatively to the actuator ring 1, which as herein shown coacts to swing the locked set up for pipe size indication to progressively vary such in a slightly increasing diameter or radius direction. This brings about a slight retiring of the respective chasers 24 so that their cutting depth on the work is decreased and there is a resultant tapering thread. When this thread has been run to the desired extent, the direction of operation of the handles 5 may be reversed, bringing about a clearance of the cut thread by the working of the ring 1 away from the clamp and sleeve extension 11. As the chasers 24 are brought clear of the end of the pipe, the bolts 14 may be backed off and this tool or device removed ready for re-application to another pipe end for a repetition of this cycle of operations.

What is claimed and it is desired to secure by United States Letters Patent is:

1. A cutter head embodying a plurality of chasers each having longitudinally on a side thereof serrations providing an advance cutting edge of a multi-thread extent with straight line uniform follower contour, another side of each chaser being at an angle to said side having the advance cutting edge and having a plane face removable as a sharpening upkeep for maintaining detail of serrations and the desired advance angle for said cutting edge, sharpening take-up means for mounting said chasers in said head to have said serrations following said cutting edges define for each chaser a straight line maintained approximately tangential to the axis of said head, and an adjusting device for shifting the sharpening take-up means and chasers simultaneously in said head to vary the radial distance of said tangentially extending serrations from the axis of said head for causing said chasers of uniform thread depth to cut a tapering thread.

2. A cutter head embodying a cutting chaser having longitudinally on a side thereof serrations providing an advance cutting edge of a multi-thread extent with straight line uniform follower contour, another side of said chaser being at an angle to said side having the advance cutting edge and having a plane face removable as a sharpening upkeep for maintaining detail of serrations and the desired advance angle for said cutting edge, sharpening take-up means for said chaser in said head to have said serrations following said cutting edge define a straight line maintained approximately tangential to the axis of said head, and an adjusting device co-operating in relative progress of the head as to the work from the axis of said head for causing said chaser of uniform thread depth to cut a tapering thread.

3. A cutter head embodying a plurality of cutting chasers each having longitudinally on a side thereof serrations providing an advance cutting edge of a multi-thread extent with straight line uniform follower contour, another side of each chaser being at an angle to said side having the advance cutting edge and having a plane face removable as a sharpening upkeep for maintaining detail of serrations and the desired advance angle for said cutting edge, sharpening take-up means for mounting said chasers in said head to have said serrations following said cutting edges define for each chaser, a straight line maintained approximately tangential to the axis of said head, and an adjusting device for shifting the sharpening take-up means and chaser simultaneously in said head to increase the radial distance of said tangentially extending serrations from the axis of said head for producing a tapering thread.

4. A cutter head having an axially extending ring portion and additionally an integral inwardly extending flange, a plurality of chasers in sequence, independently shiftable mounting means for the chasers, said mounting means being partially shrouded by said flange and embodying a plate radially bounded by the axially extending ring portion and having ways, chaser holders anchoring the chasers for shifting along said ways, and means extending through the plate and flange and operable for effecting relative movement therebetween for determining shifting of the holders.

5. A cutter head ring having an axially extending portion and additionally an integral inwardly extending flange, a plurality of chasers in sequence, independently shiftable mounting means for the chasers, said mounting means being angularly shiftable and embodying chaser holders each having a guide and rack means, a plate embraced by the ring axially extending portion and having a guide for each holder guide, and toothed means coacting with said rack means having movement relatively to the ring for thereby adjusting said chaser.

6. A cutter head ring having an axially extending portion and additionally an integral inwardly extending flange, a plurality of chasers in sequence, independently shiftable mounting means for the chasers, said mounting means embodying a plate embraced by the ring axially extending portion and having ways tangentially extending as to the axis of said head, and chaser holders having seats for the dies extending in approximately perpendicular direction as to the respective ways.

7. A cutter head ring having an inwardly extending flange, a plurality of chasers in sequence, angularly and independently shiftable mounting means for the chasers, said mounting means embodying chaser holders, a plate and adjustable setting means, each of said holders having a guide and having rack means, said plate having a guide for each holder guide, and having toothed means coacting with said rack means, and said setting means capable of being operated to change the operative position of the chasers.

8. A cutter head ring having an inwardly extending flange, a plurality of chasers in sequence, angularly and independently shiftable mounting means for the chasers, said mounting means embodying chaser holders, a plate and adjustable setting means, each of said holders having a guide and having rack means, said plate having a guide for each holder guide, and having toothed means coacting with said rack means, and said setting means extending to provide an adjustable member accessible for normal operation independently of and during the operation of the cutter head to change the operative positions of the chasers.

9. A cutter head ring having an inwardly extending flange, a plurality of chasers in sequence, independently shiftable mounting means for the chasers, said mounting means being angularly shiftable and embodying chaser holders, each holder having a guide and having rack means, a plate having a guide for each holder guide, and having toothed means coacting with said rack means, there being a threaded extension from said plate, a work gripping guide nut coacting with the threaded extension, and cam pins fixed with the nut and extending to coact with the plate and head for angularly shifting the plate as to the head.

10. A cutter head ring having an inwardly extending flange, a plurality of chasers in sequence, independently shiftable mounting means for the chasers, said mounting means being angularly shiftable and embodying chaser holders, each holder having a guide and having rack means, a plate having a guide for each holder guide, and having toothed means coacting with said rack means, there being a threaded extension from said plate, a work gripping guide nut coacting with the threaded extension, cam pins fixed with the nut and extending to coact with the plate and head for angularly shifting the plate as to the head, additional means for shifting the rack means as to the plate, and a clamp for holding the additional means adjusted.

In witness whereof I affix my signature.

LEROY I. OBLINGER.